United States Patent [19]

Müller et al.

[11] 4,091,505
[45] May 30, 1978

[54] SUSPENDING APPARATUS FOR LOOPS OF SAUSAGE LINKS

[75] Inventors: Johann Müller, Biberach; Georg Staudenrausch, Biberach-Rissegg, both of Germany

[73] Assignee: Firma Albert Handtmann, Biberach, Germany

[21] Appl. No.: 777,152

[22] Filed: Mar. 11, 1977

[30] Foreign Application Priority Data

Mar. 12, 1976 Germany .............................. 2610315

[51] Int. Cl.² .............................................. A22C 11/00
[52] U.S. Cl. ......................................... 17/33; 17/1 F
[58] Field of Search .............................. 17/33, 34, 1 F

[56] References Cited

U.S. PATENT DOCUMENTS

| 1,442,232 | 1/1923 | Neuberth | 17/34 |
| 2,575,467 | 11/1951 | Reichel et al. | 17/33 |
| 2,697,850 | 12/1954 | Cross | 17/34 |
| 3,115,668 | 12/1963 | Townsend | 17/33 |
| 3,694,853 | 10/1972 | Greidier | 17/33 |
| 3,790,685 | 2/1974 | Criss et al. | 17/33 |
| 3,964,129 | 6/1976 | Townsend | 17/33 |
| 4,021,885 | 5/1977 | Muller | 17/33 |

Primary Examiner—Louis G. Mancene
Assistant Examiner—Paul J. Hirsch
Attorney, Agent, or Firm—Montague & Ross

[57] ABSTRACT

An apparatus for suspending loops of sausage links comprises a pickup member rotatable about a pickup axis and having an arm inclined at an angle to this axis and reaching toward a feeder for sausage links forming a chain. The feeder advances the sausage links along a feed axis which is laterally offset from the pickup axis. A drive rotates the pickup member so that the arm orbits the axis of the sausage chain and engages the latter between sausage links to suspend the latter in loops from the pickup member.

35 Claims, 14 Drawing Figures

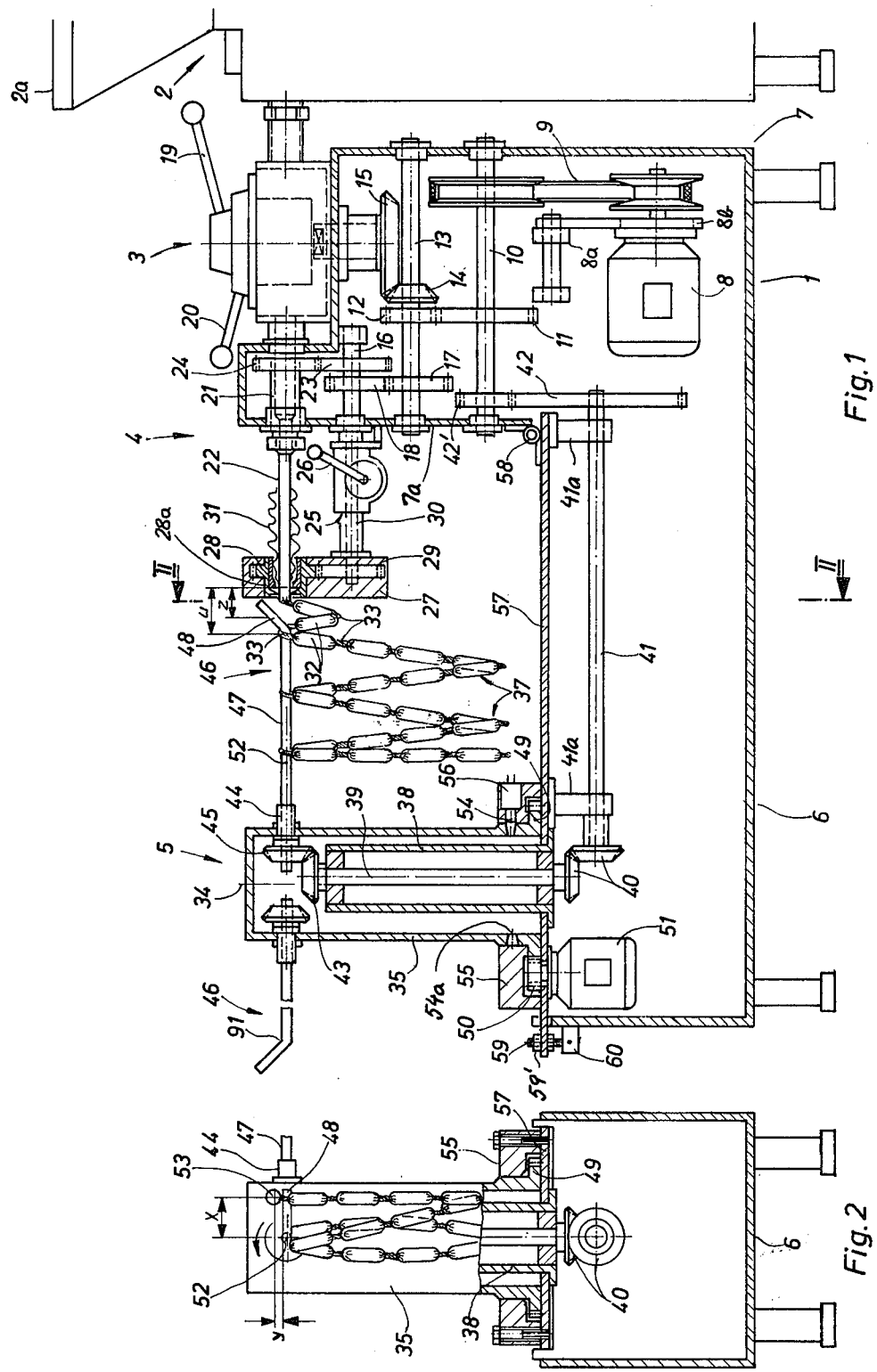

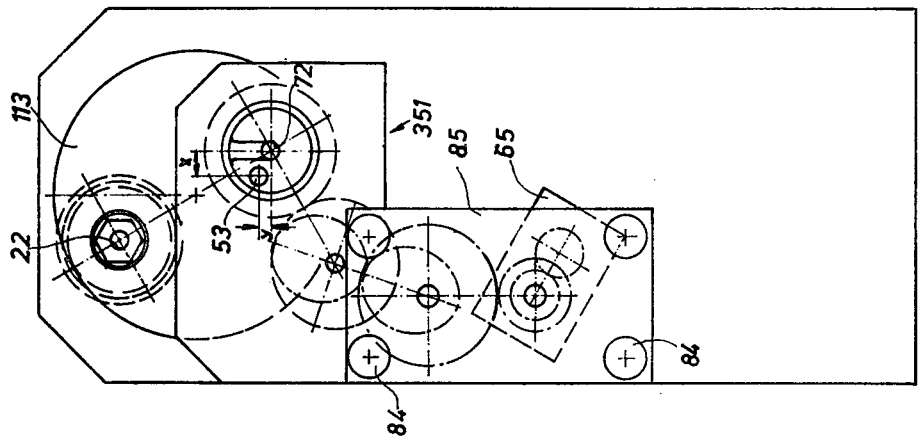
Fig. 5
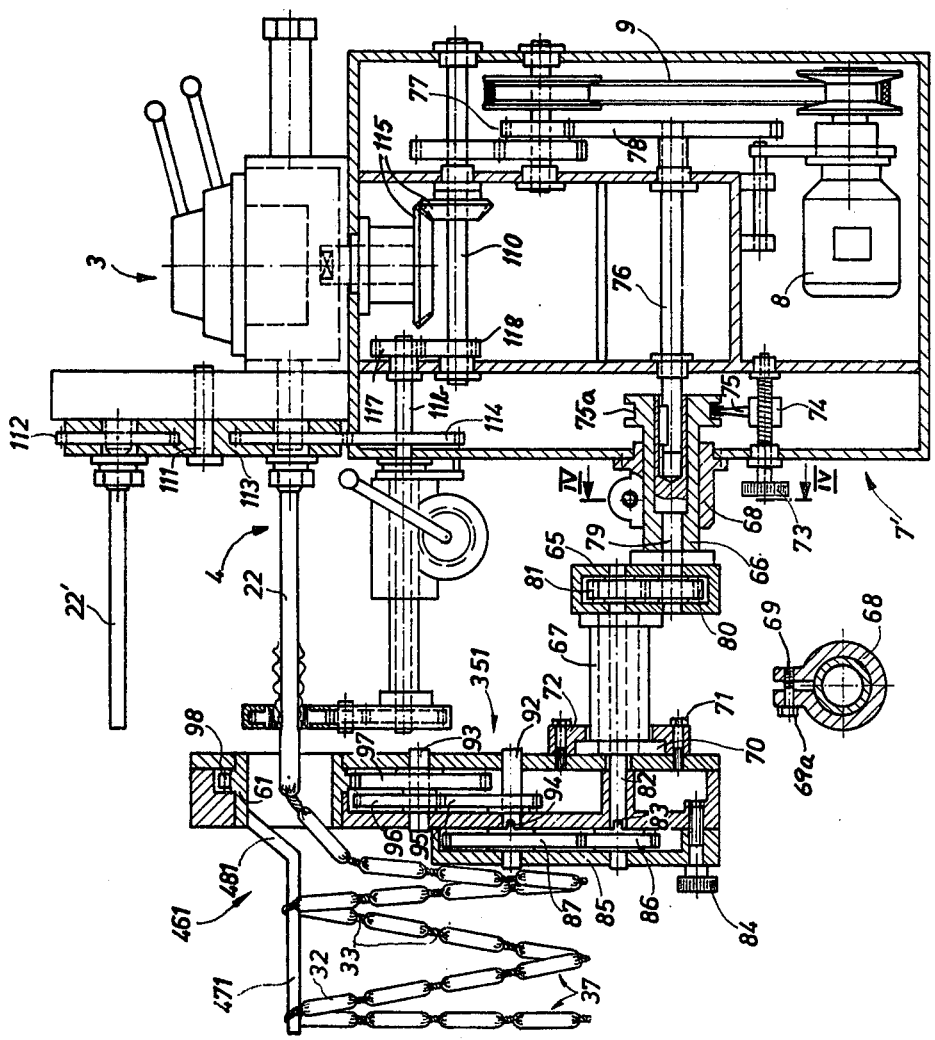
Fig. 3
Fig. 4

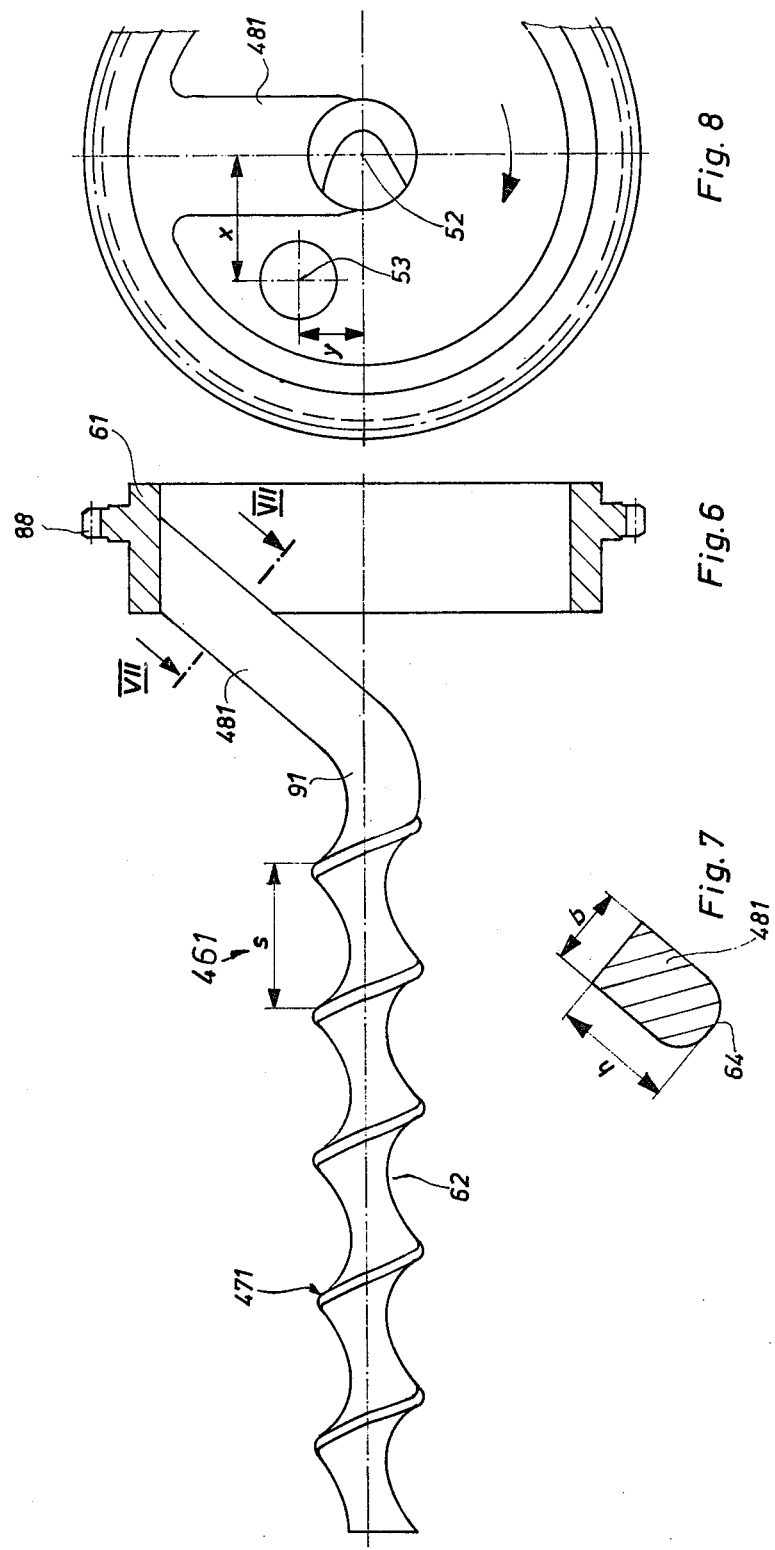

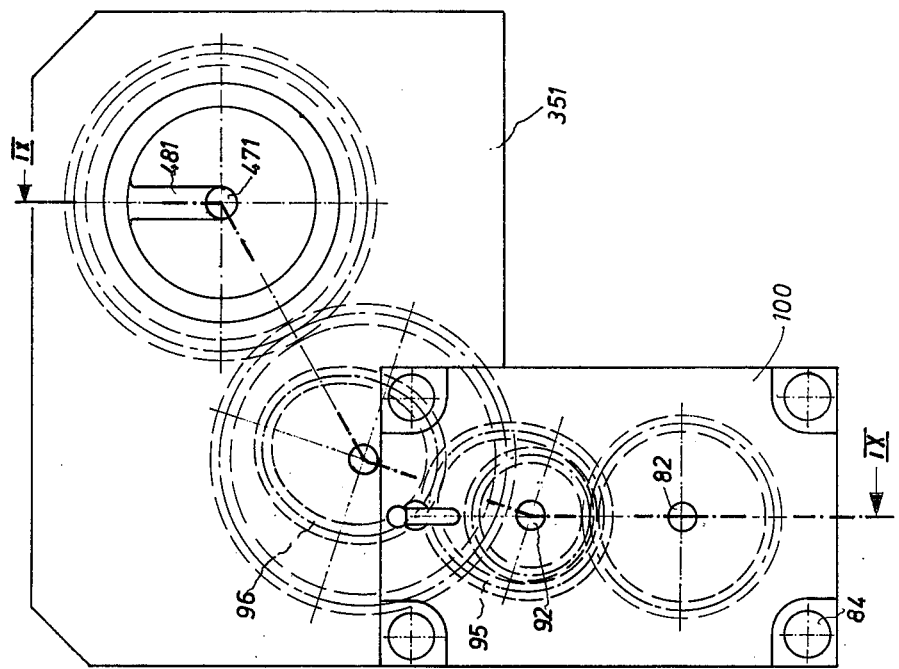
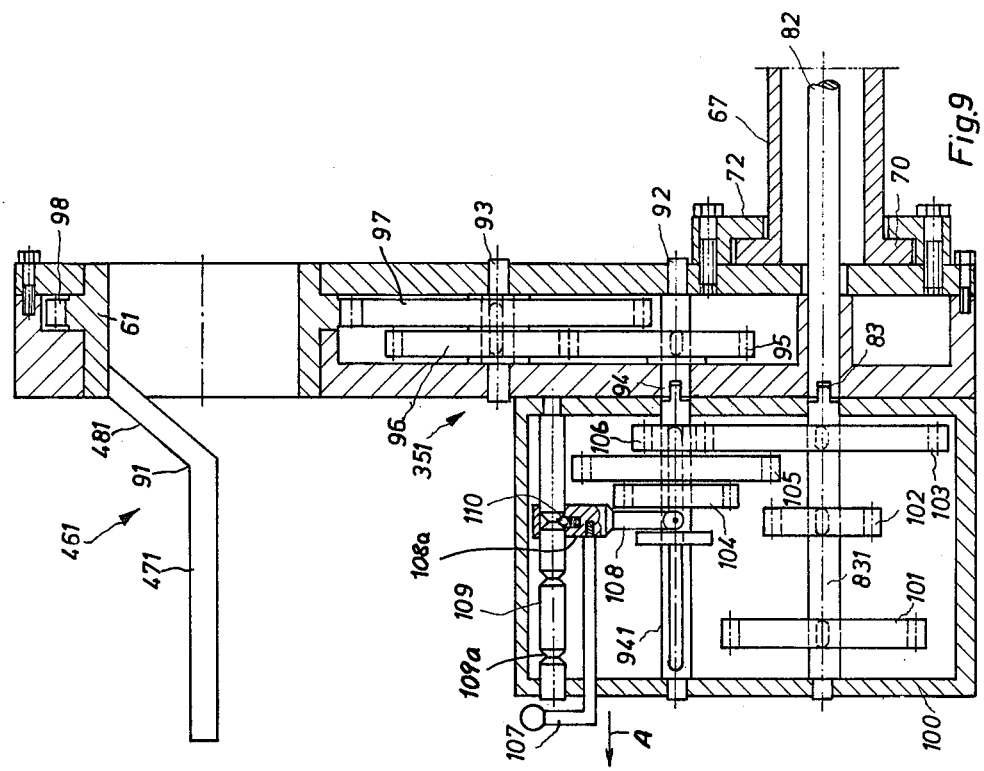

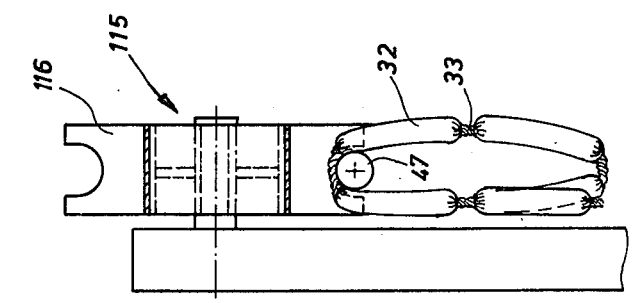
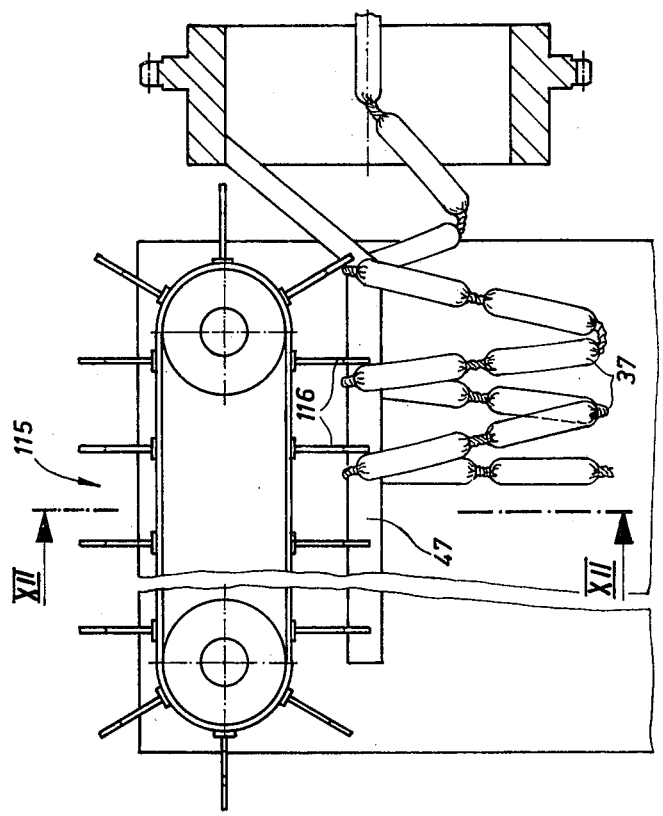

SUSPENDING APPARATUS FOR LOOPS OF SAUSAGE LINKS

FIELD OF THE INVENTION

The present invention relates to a suspending apparatus for collecting a chain of sausage links and suspending the same in loops at constrictions or twisted-off portions between the links.

BACKGROUND OF THE INVENTION

Generally sausage links are produced by metering quantities of a sausage filling material through a tube over which a length of sausage casing is drawn to fill the sausage casing upstream of a twisted-off portion or constriction of the casing. Means are provided to thereupon twist off a filled section of the sausage casing, thereby terminating a link and preparing the sausage casing to receive another quantity or portion of the sausage filling material. The resulting sausage chain or link chain thus consists of a plurality of sausage links in the common casing, separated by twisted-off portions or constrictions.

It has been proposed to engage the chain of sausage links and to suspend the same at constrictions between the sausage links in loops, each loop having a predetermined number of sausage links.

In an apparatus for this purpose (see German published application DT-OS 1 432 460) the sausage chain passes between a pair of opposite feed conveyor chains which have fingers gripping between the sausage links at the constrictions. At the downstream side of these chains, a tubular pickup device is provided which is rotatable about a slightly downwardly inclined axis and is driven synchronously with the feed of the sausage chain. At the discharge side of this pickup, a spiral-shaped taper is provided toward a rod cage which engages the sausage chain and suspends the same in loops. The distance between the discharge end of the conveyor chains from the rotating axis of the pickup and the rotating speed are determined in dependence upon the conveyor speed so that, for each revolution of the pickup member, a portion of the chain with a predetermined number of sausage links is engaged in the form of individual loops and deposited on hooks of a conveyor which is also synchronized with the pickup rotation.

A disadvantage of this system is that the entire apparatus must be constructed to accommodate a particular sausage link and thickness and a particular number of links for each loop. The speed at which the apparatus operates is also limited since the sausage chain must be advanced to the pickup tube over relatively long distances so that the sausage chain is subjected to considerable stress. The sausages are subjected to centrifugal force and may be swung so strongly outwardly that they are subjected to bending, breaking and kinking.

The stresses on the sausage casing are so great with these earlier systems that it is only possible to use relatively thick synthetic-resin sausage casing materials if high operating rates are desired. Thin or sensitive sausage casing materials cannot be used or can be used only with considerable disadvantage with respect to the operating speed and the danger to the sausage casing material.

Natural casing materials are practically excluded from consideration because of their limited stability, the nonuniformity in diameter and length, etc. Another disadvantage of the earlier device is that a pairwise suspension of the sausage links is only possible when the lengths of sausage links is relatively great.

In another conventional device, in which the sausage chain is fed from between two chains with fingers engaging between the links, a pair of disks are provided for rotation concentrically with the feed axis of the sausage chain and are connected with a screw-shaped pickup which runs at a constant distance from the common axis from the periphery of a first disk to a suspension disk, upon which the loops of sausage are deposited. The loops are carried by downwardly inclined suspending rods which further advance the sausage loops.

Here again a centrifugal force is developed which detrimentally affects the sausage links, the screw-like member and the edges of the hook structures applying significant stress to the sausages. In practice it is found that this apparatus cannot operate at the high speeds of sausage production which have become common with the newest of sausage-producing machines.

OBJECT OF THE INVENTION

It is the object of the present invention to provide an apparatus for suspending loops of sausage in which the disadvantages of the earlier systems are obviated and which can suspend conveniently and with a minimum of mechanical stress loops of sausages of various sizes and varying numbers as well as sausages having relatively sensitive sausage casing materials.

SUMMARY OF THE INVENTION

This object, and others which will become apparent hereinafter, are attained in accordance with the present invention, in an apparatus for suspending loops of sausage lengths which comprises a feeding means for advancing a sausage chain along a feed axis, and a pickup member rotatable about a pickup axis which is offset from the feed axis. According to the invention, the pickup member comprises an elbow rotatable about the pickup axis and having an arm which orbits the feed axis so as to engage tangentially the chain of sausage links and guide the same downwardly toward the elbow, i.e. toward the pickup axis.

The stresses upon the sausage chain are minimized in that the arm can engage the sausage chain at a minimum velocity and can be positioned so that the point of engagement is transverse to the feed axis and at a constriction or twisted portion of the chain between a pair of sausage links. The sausage chain or loop which is thereby suspended from the pickup member can thus be permitted to slide down the arm without significant stress toward the elbow which lies along the axis. The distance between the feed axis and the axis of rotation of the pickup member is thus only of significance in that the sausage chain is laterally engaged by the pickup arm and guided thereby toward the elbow. This distance and the radius of the pickup point from the axis of rotation of the pickup member can be held sufficiently small that the pickup speed and the speed at which the constriction is engaged is minimized so that impact and friction forces are correspondingly held to a minimum and do not detrimentally affect the sausage casing material. Even the duration for which the sausage casing material is subjected to mechanical engagement is minimized.

It will be apparent, therefore, that the sausage casing materials can be filled to a greater extend than heretofore and that the system can operate at higher speeds without detriment.

The pickup arm advantageously is inclined to the pickup axis at an angle of 50° to 70°. This imparts to the sausage chain upon engagement with the arm an axial displacement in the direction of the elbow. It is naturally possible to so shape the pickup arm that a completely uniform deceleration is provided over the length thereof as the loop of the sausage casing material advances over the elbow. In any event it has been found to be preferable to use a rectilinear pickup arm having a fixed angle with the pickup axis.

Advantageously, the pickup arm has an elongated cross section with a preferably rounded small side which engages between sausage links, the constriction which is to rest upon the pickup member. This improves the engagement of the constriction without application of local stress to the sausage casing material. The cross section of the pickup arm can have a width (measured across the small side) which at most is equal to the smallest diameter of a sausage to be processed by the machine and at least is equal to twice the smallest diameter. With larger sausage cross sections or diameters, therefore, the local deformation may be somewhat higher although the speed at which the pickup device is operated is normally slower so that the resultant stress is minimal.

The pickup arm and elbow can be provided with an elongated guide for the sausage loops, preferably in the form of a shaft extending along the pickup axis from the elbow away from the pickup arm. This guide can be detachable although it is preferable to form it unitarily or rigidly with the elbow.

The guide shaft can be cylindrical although best results are obtained when it is formed as a worm with a pitch which is larger than the diameter of the sausage which is processed. In this case, the pickup arm is preferably a tangential extension of the turns of the worm. The worm shaft is advanced in the cadence of the loop formation to hold the loops apart while displacing them without significant friction. Lubrication may be provided by the water which is usually supplied to the sausage casing material. The worm groove preferably has a radius of curvature which is equal to that of the largest-diameter sausage links to be produced.

According to a particularly advantageous embodiment of the invention, the pickup member is provided at its end removed from the arm with a holder which is mounted upon a turret with a multiplicity of similar pickup arms which can be rotated into operative position and there engage respective drive members. In this case, the cantilever support for the guide shaft and the pickup member generally must be sufficient to support the weight of the links of sausage to be carried thereon without bending or tilting.

When a turret arrangement of this type is provided, while one pickup member is receiving sausage loops, the sausage loops of another pickup member, previously disposed in the operative position, can be removed for further processing, e.g. smoking.

In another embodiment of the invention, the pickup member comprises a ring which is disposed adjacent the sausage link outlet of the feed means and has the inclined arm fixed to the interior of this ring. In this case, the ring is rotated to drive the pickup member.

The pickup member is adjustable in the direction of the pickup axis with respect to the outlet or discharge end of the feeding means such that it is disposed at a distance from the outlet of at most two sausage lengths for the shortest sausages to be produced and at least 0.8 times the length of the longest sausage to be made. This adjustment capability permits sausages of a variety of lengths to be made and nevertheless permits the pickup arm to engage constrictions between the sausages rather than the bodies of the sausage links.

To accommodate the production os sausages of different diameters or thicknesses, as well as sausages of different lengths, it is advantageous to provide the pickup member with means for shifting its pivotal support transverse to the feed axis and advantageously in two mutually perpendicular directions, i.e. vertically and horizontally. In this case, the maximum transverse adjustment of the pickup axis from the feed axis is at least, in the horizontal direction, equal to the largest diameter of the sausage to be made.

It has been found to be desirable, in the case in which a ring is provided to support the pickup member, to journal this ring in a support which is mounted on an eccentric swingable with respect to the machine housing and can be locked in place by a manual control. To permit the loops of the sausage chain to have varying numbers of sausage links, it is advantageous to drive the pickup member relative to the feed device with a transmission having an integral transmission ratio, i.e. a transmission ratio which is a whole number. A simple transmission for this purpose can comprise a pair of meshing gears having predetermined numbers of teeth and mounted upon a common support which can be replaceably affixed to the carrier of the pickup member. Of course, a stepped transmission having a member shifting the latter between the steps, can also be provided.

The eccentric for the carrier can be provided as a transmission housing which can receive a portion of the transmission driving the pickup member.

It has also been found to be advantageous to drive a pickup member at a cyclically varying speed so that the speed at which the arm meets the sausage chain is less than the median speed of the pickup member. A suitable transmission for this purpose comprises a pair of meshing gears each of ellipsoidal configuration.

BRIEF DESCRIPTION OF THE DRAWING

The above and other objects, features and advantages of the present invention will become more readily apparent from the following description, reference being made to the accompanying drawing in which:

FIG. 1 is a diagrammatic longitudinal cross-sectional view of a sausage-making machine with a hanging device for suspending selected numbers of sausage links in a succession of loops;

FIG. 2 is a section taken along the line II — II of FIG. 1;

FIG. 3 is a vertical longitudinal cross-sectional view through a machine according to the present invention which represents a modification of the system of FIG. 1;

FIG. 4 is a cross-sectional view taken along the line IV — IV of FIG. 3;

FIG. 5 is a partial elevational view of the machine of FIG. 3 as seen from the left and drawn to a larger scale;

FIG. 6 is a detail view, drawn to an enlarged scale and representing a section of a portion of the device of FIG. 3 constituting the sausage-chain advancing device;

FIG. 7 is a section taken along the line VII — VII of FIG. 6;

FIG. 8 is an end view as seen from the left in FIG. 6;

FIG. 9 is a vertical section corresponding generally to that of FIG. 3 but illustrating still another embodiment of the present invention, the view of FIG. 9 corresponding to a section along the line IX — IX of FIG. 10;

FIG. 10 is an elevational view from the left of the apparatus of FIG. 9;

FIG. 11 is a diagrammatic elevational section of an embodiment of the present invention;

FIG. 12 is a section taken along the line XII — XII of FIG. 11;

SPECIFIC DESCRIPTION

Figure 13:
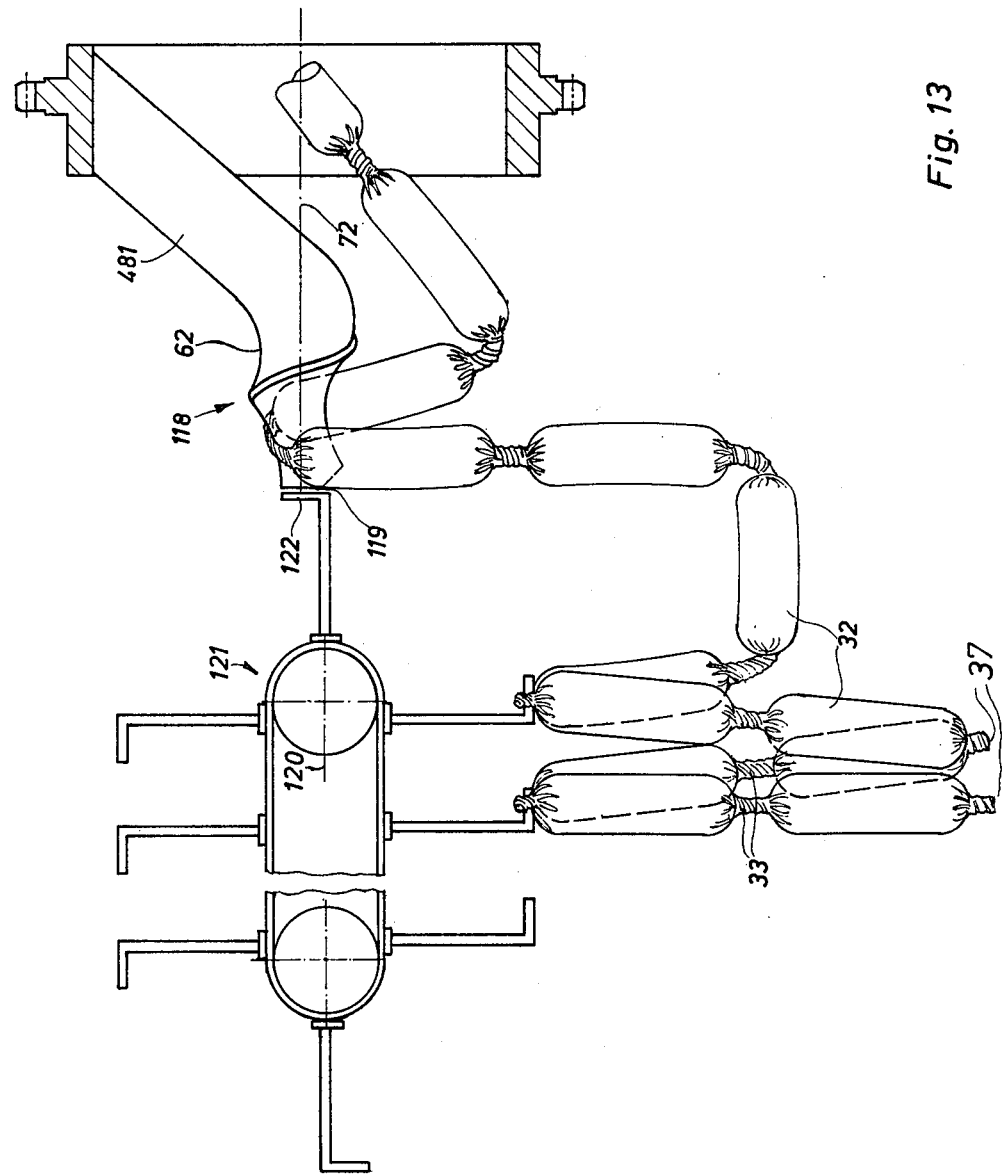
FIG. 13 is a view similar to FIG. 11 of still another embodiment of the invention.

FIGS. 1 and 2 show a sausage-making machine 1 which is provided with a filling pump 2 displacing the sausage-filling material under constant pressure from a hopper 2a into a metering pump 3 by which a metered quantity of sausage filling material, corresponding to the quantity necessary to fill a link, is forced at each stroke of the pump 3 into a filling and twisting device represented generally at 4. The latter device forms a feed arrangement for a hanging device represented generally at 5 which is mounted, with the other parts of the machine 3, 4, upon an extended (elongated) machine bed 6 of the frame or housing 7 of the sausage-filling machine.

In the machine bed or housing 7, there is provided an electric motor 8 which is connected, by a belt transmission 9, to a main drive shaft 10 journaled in the housing. To maintain a constant belt tension, the motor 8 is pivotally mounted on a support 8a by an arm 8b.

The shaft 10 carries a drive gear 11 which meshes with a driven gear 12 carried by a shaft 13, parallel to the shaft 10, journaled between the walls 7a and 7b of the housing. The gear 12 is keyed to the shaft 13 which is thus driven by the gear transmission represented at 11, 12.

The shaft 13 also carries a bevel gear 14 which meshes with the driven bevel gear 15 at the driving side of the dosing or metering pump 3.

The metering pump is connected to the twisting-control shaft 16 via a gear 17, keyed to shaft 13, meshing with a gear 18 keyed to the shaft 16.

The pump 3 can be a double-acting rotary piston pump which is of the variable-capacity type so that its displacement quantity per revolution, i.e. the portion size, is controlled by a lever 20 which can be displaced by the operator of the machine. A further lever 19 can clamp the lever 20 to lock the setting of the latter. Such pumps are conventional in the art and hence need not be described in greater detail here.

The outlet of the metering pump 3 is, as is also conventional, provided with a sleeve arrangement 21 carrying a twisting tube 22 which is driven by a gear 23 keyed to the shaft 16 and meshing with a gear 24 keyed to the sleeve 21. Thus, in the cadence of operation of the pump 3, the sleeve 21 and the tube 22 connected therewith can be rotated to twist off lengths of sausage at the end of a sausage-filling operation.

The machine housing 7 also comprises a telescoping tube arrangement 25 which can be axially displaced by a lever 26 parallel to the tube 22 and which carries a turntable 27 which is formed with an externally toothed sleeve 28 coaxial with the tube 22.

The sleeve 28 meshes with a gear 29 and is driven, in turn, by a telescoping shaft 30 connected by a spline coupling or the like with the driven shaft 16 so that the shafts 16 and 30 are operated synchronously with the tube 22 with cyclically varying speed. The cyclically varying speed can be produced by forming the meshing gears 17 and 18 as ellipsoidal gears as indicated in FIG. 1. The toothed sleeve 28 carries a brake ring 28a which frictionally retains the tube 31 of sausage casing against the left-hand end of the tube 22. The tube 31 of sausage casing material is drawn loosely over the tube 22 to the right of the brake ring 28a.

Since the sausage links 33 at the discharge end of tube 22 are held against rotation, when the motor 8 is turned on and the motor of the filling pump 2 is energized, metered quantities of the sausage filling material are displaced through the tube 22 and are forced into the sausage casing which is gradually drawn off the tube 22 past the brake ring 28a until a full sausage link is formed, the tube 22 being rotated to twist off the finished length of sausage and form a constriction ahead of the next sausage link to be formed. As a result, constrictions 33 are formed by the twisting-off process between the individual links of sausage 32. Such operations correspond to those described in commonly assigned application Ser. No. 764,990 filed Feb. 2, 1977.

When larger sausage portions are to be made, the metering pump 3 can be eliminated and the outlet from the filling machine 2 can be connected directly onto the sleeve 21 and the tube 22. Portioning is then accomplished by the filling machine 2 which can be actuated by a cam-operated switch when sausage links of the desired length are produced. The cams can be carried by the twisting-off device or any of the shafts serving to drive the latter.

At the end of the machine bed 6, upon its cover 57, there is provided a support 35 in the form of a cylindrical drum or turret rotatable about the vertical axis 34. This drum is provided, eccentric to the axis 34, with a further cylinder drum 36 which is fixed to the cover 57 and carries a shaft 39 whose upper end is connected by a bevel gear selectively to the bevel gear 45 to be described in greater detail hereinafter.

At its lower end, within the housing 6, the shaft 39 is connected to a horizontal shaft 41 by bevel gears 40, the shaft 41 being journaled in blocks 41a on the underside of the cover 57. The shaft 41, in turn, carries a gear 42 which meshes with a gear 42' keyed to the shaft 10 mentioned previously. The gearing 42, 42', etc. is selected such that a full revolution of shaft 39 corresponds to eight portioning operations of the pump 3 and eight twisting-off operations of the sleeve 22, the mechanism 27 – 30, etc.

The upper end of the drum 35 is provided with at least two and preferably three angularly equispaced journal bushings 44 at the inner end of each of which is provided a bevel gear 45 which can, upon rotation of the turret 35, mesh in turn with the bevel gear 43 at the upper end of shaft 39.

Each of the bushings 44 also carries a longitudinally adjustable pickup device 46. Each of the pickup devices 46 has a cylindrical guide shaft 47 which terminates at its free end with a central elbow 91 (FIG. 6) extending into a pickup arm 48.

Because of the eccentric arrangement of the drums 35, 36, the upper end of the shaft 39 meshes with each of the bevel gears 45, through its bevel gear 43, only when the respective shaft 47 extends horizontally to the right as shown in FIG. 1.

The drum flange 49 of turret 35 is provided with gearing, i.e. an array of gear teeth as in a crown gear, meshing with a pinion 50 of an electric motor 51 mounted in the bed 6 of the machine. The motor 51 can be of the servomotor type so that, at a switching command, it rotates the turret 35 through an angle exactly equal to the angular offset of the bushings 44. In the case in which four such bushings 44 are provided, each with a corresponding bevel gear 45, shaft 47 and angled arm 48, the motor 51 rotates the turret 35 exactly through 90° upon each triggering of a switch (not shown) therefor. When each of the shafts 47 is in the precise position illustrated in FIGS. 1 and 2, its axis 52 of rotation, corresponding to the axis of rotation of the respective pickup 46, is exactly parallel to the axis 53 of tube 22 and is horizontally spaced therefrom by a distance $x$.

It should be noted that only the distance $x$ directly adjacent the twisting-off turntable 47 is of significance and some nonparallelism of the axes 52, 53 can be tolerated. Hence the distance $x$ can be adjusted by appropriate angular positioning of the turret 35.

The setting of the turntable in its precise position for effective pickup of the sausage links can be effected by an indexing means. Advantageously, this indexing means includes an indexing pin 54 of conical configuration which is biased by a spring (not shown) into a complementary bore of the turret drum 35 but can be withdrawn therefrom by an electromagnet 56. The indexing device can be disposed in a cover plate 55 enclosing the gears 49, 50 and overlying the flange of the turret 35. An indexing bore is shown at 54a.

The cover plate 55 thus forms a pivot bearing for the turret 35 so that the displacement of the cover plate 55 angularly about the axis 34 permits adjustment of the distance $x$ in the indexed position of the turret.

The cover 57 of the machine bed 6 is swingably mounted at 58 about a horizontal axis so that it can be tilted upwardly to a degree controlled by a screw 59 which is received in a nut 59' anchored in the cover 57. The screw 59 bears against an abutment 60 of the machine bed 6. Since the cover 57 can only be adjusted through a relatively small angle, there is no material interference with the meshing of the gears 42 and 42'.

This adjustment is provided to permit the height of the axis 52 to be varied in the region of the turntable 27. Thus, the vertical distance $y$ between the axes 52 and 53 can be changed to a small degree via adjustment of the screw 59. The distance $x$ can be about 35 mm and, since the distance $y$ is a small fraction thereof, the distance $y$ may range from 1 to 15 mm.

Another especially important dimension for proper functioning of the apparatus is the distance $z$ between the end of tube 22 and the initial engagement of the pickup arm 48 with the sausage chain. Because of the inclined orientation of the pickup arm, this distance is dependent upon the settings of the distances $x$ and $y$. The distance $z$ can be adjusted by varying the position of the arm 48, i.e. by longitudinally shifting the shaft 47 in its holding sleeve or bushing 44.

All three parameters $x$, $y$ and $z$ can be read directly from scales provided on the machine but not illustrated and, to the extent necessary, tables can be provided for various sizes of the sausage links. The distance $z$ is customarily 20 to 30% smaller than the distance between two constrictions 33, i.e. than the end-to-end length of a sausage link. This ensures engagement of the sausage links at a constriction or neck between them. The distance $u$ from the end of the tube 22 corresponds approximately to the sausage length. With small sausages, i.e. relatively short sausages, $z$ can have a dimension corresponding to two sausage lengths. The aforementioned dimension $z$ permits engagement of one of the constrictions between a pair of sausage links before the constriction at the upstream end of the last link to be formed is completely twisted off.

FIG. 2 illustrates the instant in which the pickup arm 48 being displaced to the left engages the sausage chain from beneath in the region of the constriction 33 and lifts the same so that this constriction slides on the arm 48 to the elbow 91 and then on to the guide shaft 47. Upon rotation of about 90° of the pickup arm, two additional sausage links are produced and after a rotation of a further 270° into the position illustrated in FIG. 2, there is formed a sausage loop 37 with eight sausages and this latter loop is hung again on the guide shaft 47.

Since the distance $x$, whose maximum value has been illustrated in FIG. 2, is relatively small, and the pickup arm rotates in a ratio of 1:8 with respect to the strokes of the machine (sausage-producing strokes) the speed with which the arm 48 engages a sausage chain is relatively small. All adjustment means for the distances $x$, $y$ and $z$, and even $u$, can be eliminated when the machine is used for long periods for the production of one kind of sausage.

In the embodiment of FIGS. 3 through 5, the pickup 461 has a ring 61 (FIG. 6) which internally is formed with a shank 481 extending radially inwardly and inclined to the axis at an angle of about 60°, being provided at this axis with an elbow 91 extending to the guide shaft 471 which is formed as a worm with a helical groove 62 whose radius of curvature is somewhat greater than that of the thickest sausage links to be made. The pitch $s$ of the worm is correspondingly greater than the diameter of the sausage links by, for example 20 to 50%.

The rounded guide surface 64 of the shank 481 forms a tangential transition to the worm groove 62. The elongated cross section of the shank 481 has a width $b$ which is slightly larger than the dimension of the smallest sausage link to be made and a height $h$ which can be somewhat greater than the diameter of the largest sausage made on the machine although it can correspond at least to the latter diameter.

As will be apparent from FIG. 8, therefore, the discharge axis 53 of the sausage links is disposed within the interior of the ring 61. FIG. 8 also shows that the distance $x$ between the axes 52 and 53 can be relatively small and hence that the speed with which the pickup shank 481 engages the sausage chain can be correspondingly small. The distance $x$ is preferably between 25 and 30 mm.

Since the sausage casing before the pickup is usually wet, the thus-lubricated helical groove has been found to be particularly effective in carrying the individual sausage loops in a separated condition by rotation of the shaft 471 to the free end of the latter without damage to the sausage and without difficulty.

Reverting to FIGS. 3 – 5, it can be seen that the ring 61 is formed at its outer periphery with gear teeth 88 or 98 and is rotatable in a carrier 351 which is rotatable freely via an eccentric arm 65 and can be locked to the machine housing 7'. The eccentric arm 65 itself is formed as a transmission housing which carries a guide bushing 66 and an eccentric bushing 67. The guide bushing 66 is longitudinally and rotationally adjustable centrally in a clamping bushing 68 fixed to the housing and can be locked by a slip ring 69 which can be tightened thereon by a screw 69a (FIG. 4).

The eccentric bushing 67 can be locked, in turn, by its flange 70 via screws 71 and a clamping ring 72. Thus the pivot axis 52 of the pickup device can be adjusted radially with respect to the axis 53 along which the sausage links emerge and can be secured in place by the locking device 70 – 72 described. The axial adjustment of the pickup, upon release of the locking device 69, is effected by an adjusting screw 73 which is journaled in the machine housing 7' and engages a nut 74 connected by a fork 75 and a groove 75a to the guide bushing 66.

The guide bushing 66 is disposed centrally with a shaft 76 journaled in the machine housing 7' and driven from the motor 8 by a stepless belt drive 9 and gears 77 and 78. The drive shaft is keyed by splining to the shaft 79 which can thus be telescopingly displaced with respect to the drive shaft 76. The shaft 79 is journaled in the eccentric arm 75 and is connected by gears 80, 81 to an eccentric shaft 82. The eccentric shaft 82 passes through the eccentric bushing 67 into the pickup housing 351 and terminates therein a releasable jaw clutch 83.

The housing 351, in turn, is formed as a closed transmission housing and carries two additional shafts 92, 93 which are journaled therein. The shaft 92 terminates in a jaw clutch 94. Between the jaw clutches 83 and 94, as described hereinafter, further transmission elements are provided to control the loop lengths to be hung upon the carrier 471.

The shafts 92 and 93 are coupled by a pair of ellipsoidal gears 95, 96. The shaft 93 is also provided with a gear 97 which meshes with the teeth 88, 98 of the ring 61 and has the same diameter and number of teeth as the latter.

The ellipsoidal gear transmission 95, 96 varies the angular velocity of the pickup cyclically approximately at a ratio of 1:3 to 1:4. At the lower angular velocity and hence lower speed, the shank 481 meets the loop of sausage lengths and the velocity is thereupon increased for displacement of the loop along the helical groove 62 mentioned previously. The jaw clutches 83, 94 can be released to position the shaft 471, 481 with respect to the ellipsoidal gears to ensure that the loops of sausage links to be picked up are engaged at the lowest velocities of the pickup device. Only when the sausage loop is properly seated in the worm groove 62 is the shaft 471 driven at its highest speed.

FIG. 3 also shows that the tube 22 is mounted upon a turret 113 which can carry a plurality of such tubes. Another tube 22' has also been illustrated.

At least two such tubes, e.g. offset at 180° from one another about the horizontal stub shaft 111, are customarily provided so that the upper tube 22' may receive a fresh length of sausage casing while the lower tube 22 feeds the sausage casing material to the sausage-filling end of the tube 22. Upon rotation of the turret 113 about the axis of shaft 112, the tubes 22 and 22' may be alternately aligned with the discharge side of the metering pump 3. To effect rotation of the turntable 113, the latter can be provided with any conventional indexing or drive device.

Each of the tubes 22, 22' carries a respective gear 112 which can mesh, in the appropriate position, with a gear 114. The latter is driven by a shaft 116 whose gear 117 meshes with a gear 118 on a shaft 110 connected by bevel gearing with the pump 3. The shaft 110 is driven by the stepless belt transmission 9.

To change the transmission ratio between the clutches 83 and 94, we may use a gear change arrangement as shown in FIG. 3. The housing 35 may be provided with a bearing plate 85 which can be attached be screws 84 and which carries the meshing gear wheels 86, 87. These gear wheels 86 and 87 are connected by the clutches 83 and 94 with the eccentric shaft 82 and the shaft 92, respectively. In the embodiment illustrated, the gear 87 is shown to be larger in diameter than the gear 86. They may have the same diameter or any other relationship as desired. Usually the cover plates 85 and the respective gears 86, 87 are provided with gear tooth ratios of, say, 1:1, 1:2, 2:1 and 1:3. The transmission ratio of these gears determines the ratio of the number of revolutions of the pickup per working stroke of the machine. Hence, for any desired length of sausage loop desired, it is merely necessary to interchange the respective bearing plates 85 via removal and replacement upon release and re-engagement of the screws 84.

In the embodiment of FIG. 9, the gear change is effected by means of a quick-change gear box. In this case, the plate 85 is removed and the gear box 100 is mounted in its place. The gear box 100 has a shaft 931 which engages the jaw clutch 83 and carries three gears 101, 102, 103 of different diameters and number of teeth. A shaft 941 is also journaled in the gear box 100 and engages the jaw clutch 94. The shaft 941 carries a three-gear block 104 – 106 which can selectively engage the gears 103, 102 and 101 upon displacement of the block along the shaft 941 to which the block is keyed. The displacement of the block 104 – 106 can be effected by a fork 108 which is connected to a slide 108a shiftable along a guide rod 109 which is provided with indexing grooves 109a into which a spring-biased indexing ball 110 can be received. The slide 108a is fixed to a handle 107 extending from the housing 100 and enabling the shifting of the gear block 104 – 106 from the position shown to the left (arrow A) as illustrated in FIG. 9. As can be seen from FIG. 10, the gear box 100 is set back, i.e. lies behind the pickup unit 471, 481, so that it does not interfere with the formation of the sausage loops.

As can be seen from FIGS. 11 and 12, when a smooth guide shaft 47 is provided (see, for example, FIG. 1), it may be provided with a spacer or stripping conveyor 115 which is formed with spacer or stripping fingers 116 extending transversely to the shaft and to the conveyor belt which is guided over a pair of rollers. Each of the fingers 116 engages a respective loop of the sausage links and, at uniform speed and with uniform spacing, displaces the same toward the free end of the shaft. The distance between the stripper fingers has been exaggerated in FIG. 11 only for illustration purposes and generally need not be greater than twice the thickness of a sausage link. FIG. 12 shows that each of the fingers 116 is formed with a concavity corresponding to at least a semi-circle and engaging the upper half of the shaft 47 while being complementary in curvature thereto.

FIG. 13 shows an arrangement in which the arm 481 is provided with an elbow 462 extending along the acis 72 and terminating in a single turn or less of a worm as represented at 118. The end of the arm 118 lies in a radial plane 119 transverse to the axis 72.

In this embodiment, a conveyor belt 121 is provided which is formed with transversely extending hooks, the conveyor belt having its medium plane 120 disposed slightly below but parallel to the axis 72 and being synchronized with the rotation of the arm 481. The belt 121 is driven in the clockwise sense in FIG. 13 and is positioned so that its hooks 122 lie directly adjacent the plane 119 to receive the loops of the sausage while each arm is horizontally disposed. Thereafter, the hooks swing downwardly so that the loops of sausage chain hang freely at the twisted-off portions 33 as can be seen at the lower left in FIG. 13. In a modification of this embodiment, the hooks can even be somewhat upwardly curved in this depending position so that there is no danger that a loop can slide off from the hook. In this case, the median plane of the conveyor belt can be somewhat raised.

Of course, the various embodiments can be combined in any compatible combination. For example, the hook conveyor FIG. 13 may be used with either the smooth shaft 47 or a shaft provided with a helical groove as described and can be combined with a conveyor as described in connection with FIGS. 11 and 12 which slides the loops along the shaft. The shafts can also be tilted somewhat to the horizontal so that the sausage-link loops slide by their own weight along the shaft to the end thereof and enable the loops to be picked up by a hook conveyor of the type illustrated in FIG. 13.

Figure 14:
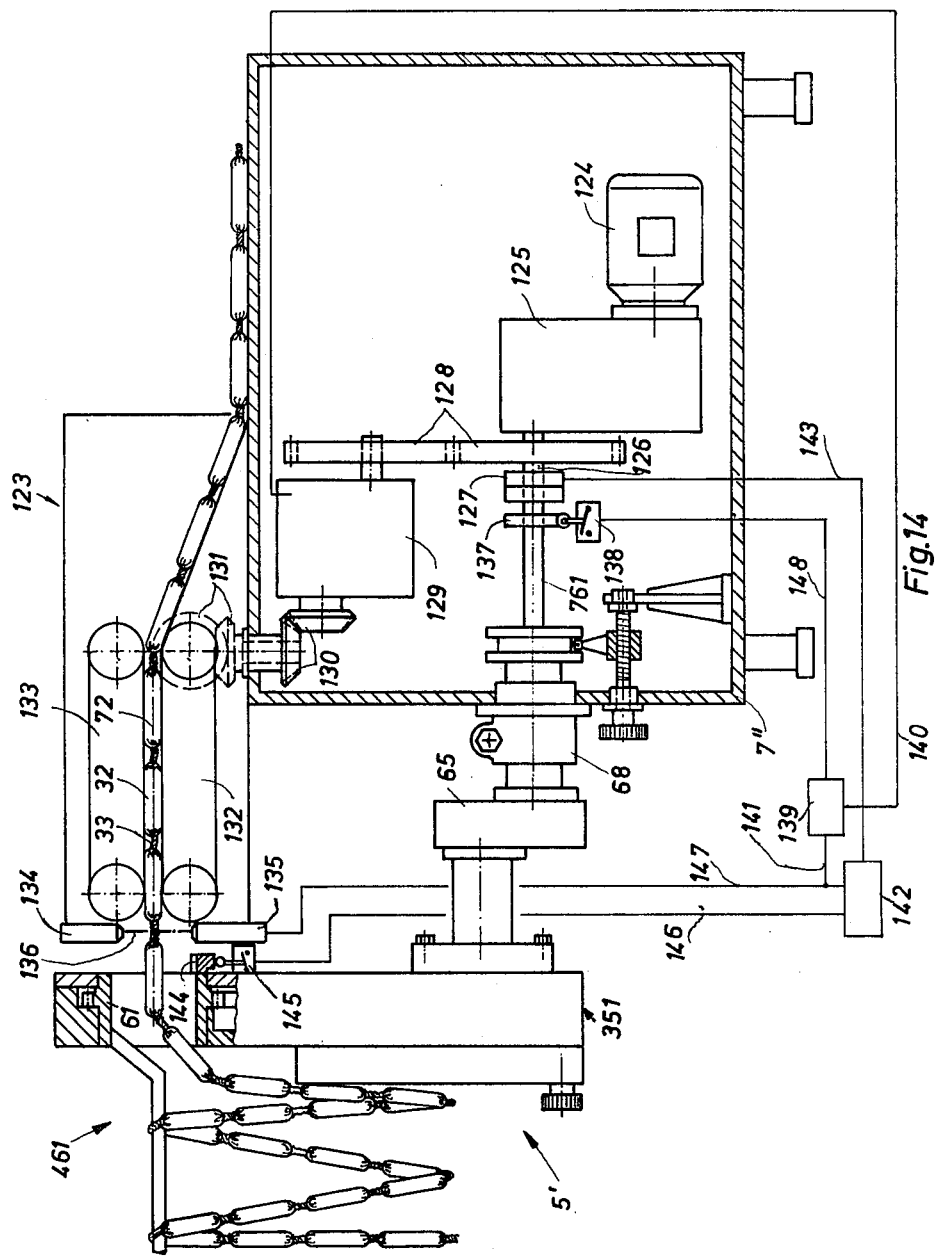
FIG. 14 is a longitudinal vertical section diagrammatically illustrating an automatic chain hanging system for use with a conveyor for the chain of sausage links.

FIG. 14 illustrates an automatic loop-hanging device which does not have a sausage filling apparatus associated therewith. In this embodiment, the hanging mechanism 5' and the feed mechanism 123 are provided on a common machine housing 7" and are driven by a common motor 124 from a first stepless transmission 125.

The stepless transmission 125, in turn, drives a shaft 126 which is connected by an electromagnetic switching clutch 143, a shaft 761 which corresponds generally to the shaft 76 of FIG. 3. The remaining elements of the drive also correspond to those of the embodiment of FIG. 3 through 5 so that these parts need not be further described.

The shaft 126 is coupled to a second stepless transmission 129 by a pair of meshing gears and the stepless transmission 129 has its output bevel gear connected to a drive bevel gear. These bevel gears have been designated at 130 in FIG. 14. The driven bevel gear is provided with a shaft which is connected by bevel gearing 131 to a pair of conveyor belts 132 coupled together for synchronous roation in opposite senses. The conveyor belt 132 engages the sausage links 33 from below via the conveyor belt 133 engages the sausage links from above so that a chain of sausage links is drawn between the belts and advanced along the horizontal discharge axis 72.

Between the feed arrangement 123 and the hanging arrangement 5', there is provided a light curtain 136 consisting of a light source 134 (e.g. a lamp) and a light-responsive switch 135. The light curtain 136 is interrupted during the passage of the sausage links and is only complete when a constriction or twisted-off neck between the sausage links 32 passes between the lamp 134 and the photosensitive switch 135.

The shaft 761 carries a cam 137 which can be angularly adjustably locked to the shaft 761 and operates a switch 138 which triggers the hanging operation. The transmission ratio between the shaft 761 and the feed device 123 can be coarsely set by the stepless transmission 129 by hand so that for each revolution of the shaft 761, the elapsed time is approximately equal to the passage of one sausage link. By angular adjustment of the cam 137 on the shaft 761, the pickup device 761 can be actuated precisely to engage the desired number of sausage links.

Both of the sensing switches 135 and 138 are connected via lines 147, 148 to a comparator 139 (e.g. an end gate) which energizes a servo motor (via line 140) adjusting the transmission ratio of transmission 129 to ensure coincidence between the pickup device 461 and the sausage feed, thereby enabling the pickup arm to engage the sausage chain only at the desired constriction 32 between the sausage links in a particular angular position of the pickup shaft or arm and the shaft 461.

The switch 134 is also connected via line 141 to a control circuit 142 which operates the electromagnetic clutch 127 via line 143. Through this circuit, the loop-hanging device is operated only when the first sausage link emerges from the feed device and the light curtain is blocked. A time-delay network in the control circuit 142 opens the clutch 127 when the light curtain is again intact, corresponding to the passage of a constriction 33. So that the pickup device is in a predetermined angular position for triggering into an effective condition, the ring 61 is provided with a cam formation, e.g. a protuberance or a recess 144 which triggers a further sensitive switch 145 which, via line 146, is connected to the control device 142 to cause a delay in the shut-off of the clutch 123 until the pickup device has reached its predetermined angular position.

The operation of the embodiment of FIG. 14 is thus relatively simple. A chain of sausage is deposited upon the housing 7" and is passed through the gap between the conveyor belts 132 and 133 and is advanced to the light curtain 136, thereby triggering the automatic operation of the device. When a predetermined count of sausage links has emerged, the pickup device 5' is energized and is driven by a shaft 761 to engage the sausage chain and form the first stretch. As each succeeding section of chain passes through the conveyor system, it forms a loop which is, in turn, picked up, the loops being displaced along the pickup arm and its shaft.

We claim:

1. An apparatus for suspending a chain of sausage links in respective loops, comprising:
   means feeding a succession of sausage links forming a sausage chain along a feed axis;
   a pickup member rotatable about a pickup axis laterally offset from said feed axis and provided with a first portion lying on said pickup axis, an elbow at the end of said first portion, and a pickup arm inclined to said feed axis and extending from said elbow toward the path of said sausage links advanced along said feed axis, said arm extending generally radially with respect to said pickup axis; and
   means for rotating said member to cause said arm to orbit about said feed axis and tangentially engage a loop of the sausage links and guide the same toward said pickup axis.

2. The apparatus defined in claim 1 wherein said arm is inclined to said pickup axis at an angle of substantially 50° to 70°.

3. The apparatus defined in claim 1 wherein said arm has an elongated cross section provided with a rounded small side engaging the sausage loop.

4. The apparatus defined in claim 3 wherein said arm cross section has a width at said small side substantially equal to the smallest diameter of the sausage to be suspended and a height substantially equal to twice the smallest diameter of the sausage to be suspended.

5. The apparatus defined in claim 1 wherein said member is formed with an elongated guide from which the loops are to be suspended and extending from said elbow away from said arm.

6. The apparatus defined in claim 5 wherein said guide is fixed to said member and comprises a shaft extending from said elbow away from said arm.

7. The apparatus defined in claim 6 wherein said shaft is formed as a worm shaft with a pitch which is greater than the diameter of the thickest sausage to be suspended therefrom, said arm constituting a tangential extension of the worm.

8. The apparatus defined in claim 6 wherein said shaft is provided at its end remote from said arm with a holder, said drive means being operatively connected to said holder for rotating same.

9. The apparatus defined in claim 8, further comprising a turrent carrying a plurality of such holders and respective pickup members, and means for angularly displacing said pickup members alternatingly into a position in which the same can be driven by said drive means to engage the sausage chain.

10. The apparatus defined in claim 9 wherein said turrent is provided with means for angularly displacing same in angular increments corresponding to the angular spacing between said members.

11. The apparatus defined in claim 10 wherein each of said members is provided with a respective gear and said drive means includes a shaft rotatable about an axis offset from the axis of said turret whereby said gears are selectively coupled with said shaft of said drive means.

12. The apparatus defined in claim 1 wherein said arm is fixed at its end remote from said elbow to a ring rotatable about said pickup axis and surrounding the sausage advanced along said feed axis, said drive means being operatively connected to said ring.

13. The apparatus defined in claim 12 wherein said arm is fixed to the interior of said ring at a downstream side thereof with respect to the direction of advance of the sausage chain.

14. The apparatus defined in claim 1, further comprising a sausage guide having an outlet, said apparatus further comprising means for displacing said pickup member relative to said outlet along said pickup axis, the last mentioned means enabling a maximum spacing of said arm from said outlet of at most two sausage lengths and at least 0.8 times the length of the longest sausage to be produced.

15. The apparatus defined in claim 1, further comprising means for shifting said pickup member transverse to the feed axis.

16. The apparatus defined in claim 15 wherein said means enables the displacement of said pickup member in two mutually perpendicular directions transverse to said feed axis.

17. The apparatus defined in claim 15 wherein the maximum transverse spacing of said pickup axis from said feed axis at least in a horizontal direction is greater than the largest diameter of the sausage to be suspended.

18. The apparatus defined in claim 16 wherein said pickup member is journaled upon a pickup carrier and means is provided to enable said pickup carrier to be swung about an adjustment axis parallel to said pickup axis, the last mentioned means including an eccentric.

19. The apparatus defined in claim 1, further comprising drive means for said feeding means and a variable transmission between the drive means for said feeding means and the drive means for said pickup means establishing an integral transmission ratio between them.

20. The apparatus defined in claim 19 wherein each of said drive means includes a respective drive shaft, said drive shafts being disposed in mutually parallel relationship, said transmission including a pair of mutually meshable gears respectively and exchangeably mounted on said drive shafts.

21. The apparatus defined in claim 20, further comprising a common support for both said gears whereby said gears can be replaced in common with said support.

22. The apparatus defined in claim 19 wherein said transmission is a shiftable stepped gear drive.

23. The apparatus defined in claim 18 wherein said eccentric is provided with a transmission for driving said member and said eccentric is formed as a transmission housing for said transmission.

24. The apparatus defined in claim 23 wherein said eccentric has an arm and the apparatus is formed with a machine housing, said apparatus further comprising clamping means for releasably locking said arm to said housing at selected angular positions of said arm.

25. The apparatus defined in claim 1, further comprising means for adjusting the location at which said arm engages said sausage chain.

26. The apparatus defined in claim 1 wherein said drive means includes means for cyclically varying the speed of said pickup member to limit the angular velocity of said arm upon engagement with said sausage chain.

27. The apparatus defined in claim 26 wherein said drive means includes a driven and a driving gear, said gears meshing with one another and being ellipsoidal gears.

28. The apparatus defined in claim 6, further comprising a conveyor extending along said shaft and provided with fingers for displacing loops of sausage therealong.

29. The apparatus defined in claim 6 wherein a sausage-loop-receiving conveyor is provided at an end of said member opposite said arm and is synchronized with said member for receiving loops therefrom.

30. The apparatus defined in claim 1 wherein said feeding means is independent from a sausage-making apparatus and is provided with a drive coupled with said drive means, said feeding means including a pair of conveyor belts receiving said sausage chain between them.

31. The apparatus defined in claim 30 wherein said drive is a stepless transmission, said apparatus further comprising circuit means for controlling said transmission to synchronize said conveyor belts with said pickup member.

32. The apparatus defined in claim 30 wherein said circuit means includes a light curtain responsive to constrictions between successive links of sausage.

33. The apparatus defined in claim 32, further comprising means controlled by said light curtain for starting and stopping said member.

34. The apparatus defined in claim 32, wherein said circuit means includes a switch responsive to the position of said member for terminating the rotation thereof.

35. The apparatus defined in claim 1, further comprising a sausage making machine having a filling tube forming said feeding means and adapted to receive a length of sausage casing, means for metering sausage filling material through said tube for filling said casing, and twisting-off means for twisting off filled sausage links at an end of said tube.

* * * * *